US008798012B2

(12) United States Patent
Kazmi et al.

(10) Patent No.: US 8,798,012 B2
(45) Date of Patent: Aug. 5, 2014

(54) PREPARATION PHASE FOR SWITCHING BETWEEN SU-MIMO AND MU-MIMO

(75) Inventors: Muhammad Kazmi, Bromma (SE); Jingyi Liao, Beijing (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 841 days.

(21) Appl. No.: 12/527,964

(22) PCT Filed: Mar. 13, 2008

(86) PCT No.: PCT/SE2008/050277
§ 371 (c)(1),
(2), (4) Date: Aug. 20, 2009

(87) PCT Pub. No.: WO2008/118067
PCT Pub. Date: Oct. 2, 2008

(65) Prior Publication Data
US 2010/0091743 A1 Apr. 15, 2010

(30) Foreign Application Priority Data
Mar. 26, 2007 (SE) ........................................ 0700766

(51) Int. Cl.
*H04J 3/00* (2006.01)
*H04W 4/00* (2009.01)

(52) U.S. Cl.
USPC .......................................... 370/336; 455/434

(58) Field of Classification Search
USPC ........................................................ 370/336
See application file for complete search history.

(56) References Cited

U.S. PATENT DOCUMENTS

| | | | |
|---|---|---|---|
| 5,909,471 A * | 6/1999 | Yun ................................. | 375/343 |
| 7,885,176 B2 * | 2/2011 | Pi et al. ........................... | 370/204 |
| 7,929,921 B2 * | 4/2011 | Love et al. ...................... | 455/101 |
| 2005/0063336 A1 * | 3/2005 | Kim et al. ........................ | 370/329 |
| 2005/0064872 A1 * | 3/2005 | Osseiran et al. ............ | 455/452.1 |
| 2006/0067263 A1 | 3/2006 | Li et al. | |
| 2006/0146760 A1 * | 7/2006 | Khandekar et al. ............ | 370/335 |
| 2007/0058595 A1 * | 3/2007 | Classon et al. ................. | 370/337 |
| 2007/0104150 A1 * | 5/2007 | Fernandez-Corbaton et al. ............................... | 370/335 |
| 2007/0223422 A1 * | 9/2007 | Kim et al. ........................ | 370/334 |
| 2007/0223423 A1 * | 9/2007 | Kim et al. ........................ | 370/334 |
| 2008/0032630 A1 * | 2/2008 | Kim et al. ......................... | 455/45 |
| 2008/0043865 A1 * | 2/2008 | Kim et al. ........................ | 375/260 |
| 2008/0095110 A1 * | 4/2008 | Montojo et al. ................ | 370/330 |
| 2008/0170533 A1 * | 7/2008 | Cyzs et al. ...................... | 370/315 |
| 2010/0091743 A1 * | 4/2010 | Kazmi et al. ................... | 370/336 |
| 2011/0122971 A1 * | 5/2011 | Kim et al. ........................ | 375/316 |

OTHER PUBLICATIONS

3rd Generation Partnership Project, 3GPP TSG RAN WG1 #42, R1-050714, "EUTRA Downlink Pilot Requirements and Design", London, U.K., Aug. 29-Sep. 2, 2005, the whole document.

(Continued)

*Primary Examiner* — Gerald Smarth
(74) *Attorney, Agent, or Firm* — Patent Portfolio Builders PLLC

(57) ABSTRACT

The present invention relates to a method and arrangement for switching between different modes in a communications network. The network comprises a number of transmit and a number of receive antennas, said modes comprising a single user mode and a multiple user mode. The method including the steps of: transmitting reference signals or predetermined sequences corresponding to both said modes comprising respective weighting matrices for said modes during a preparation phase, which comprises of one or more transmission time intervals (TTI), transmitting on a common channel, signalling information indicating start and duration of said preparation phase to all receiving equipments in a reception area.

21 Claims, 6 Drawing Sheets

(56) References Cited

OTHER PUBLICATIONS

3rd Generation Partnership Project, 3GPP TSG RAN WG1 #45, R1-061323, "Dynamic Switching Between Single and Multi-User MIMO", Shanghai, China, May 8-12, 2006, sections 2 and 4.
ISR from corresponding International Application No. PCT/SE2008/050277, issued Oct. 2, 2008.
Extended European Search Report in corresponding International Application No. PCT/SE2008050277 dated Dec. 20, 2013.
Samsung; "Dynamic Switching between Single and Multi-User MIMO"; 3rd Generation Partnership Project (3GPP) TSG RAN WG1 Meeting #45; R1-061323; XP003023532; May 8-12, 2006; pp. 1-8; Shanghai, China.
Ericsson; "Precoding Considerations in LTE MIMO Downlink"; 3rd Generation Partnership Project (3GPP) TSG-RAN WG1 #48; R1-071044; XP050105041; Feb. 12-15, 2007; pp. 1-11; St. Louis, Missouri.
Freescale Semiconductor Inc.; "Aspects of SU/MU Switching and MU-MIMO in DL EUTRA"; 3rd Generation Partnership Project (3GPP) TSG-RAN WG1 #47bis; R1-070222; XP050104655; Jan. 2007; pp. 1-4; Sorrento, Italy.
QUALCOMM Europe; "Switching between SDMA and SU-MIMO"; 3rd Generation Partnership Project (3GPP) TSG-RAN WG1 #47; R1-063437; XP050103874; Nov. 6-10, 2006; pp. 1-4; Riga, Latvia.

* cited by examiner

PREPARATION PHASE FOR SWITCHING BETWEEN SU-MIMO AND MU-MIMO

TECHNICAL FIELD

The present invention relates to a method and arrangement for switching between different transmission modes in a communication network, said network comprising a number of transmit and a number of receive antennas, said modes comprising a single-user mode and a multi-user mode.

BACKGROUND

The evolved UTRAN (E-UTRAN) supports for downlink transmissions both single-user (SU) and multi-user (MU) MIMO techniques, which makes it necessary to support switching between said modes.

In a single-user (SU-)MIMO transmission scheme all MIMO streams are assigned to a single user at a time allowing this user to achieve very high peak data rate. This approach is feasible when the base station has buffered a sufficient amount of data traffic to be transmitted to a user and all MIMO streams exhibit sufficiently good channel quality. Typically, single-user MIMO provides higher gains in less dispersive channel environments.

In a multi-user (MU-)MIMO transmission scheme several UEs are assigned the same resource block(s) on different MIMO streams at a time. This scheme is more useful for a large number of simultaneously active users in the system when these users do not require very high peak data rates. The obvious solution is to share the downlink resources among these active users.

Reference signals or pilot signals are used for cell search and acquisition, cell identification, UE measurement and channel estimation. There are two types of reference signals: Common reference signal and dedicated reference signal.

In FDD-based E-UTRAN system it is assumed that UEs in either single-user MIMO (SU-MIMO) or multi-user MIMO (MU-MIMO) mode will use the same common reference signals in all scenarios. Based on its measurements on the common reference signals the UE decides its pre-coding antenna weights (pre-coding matrix) and provides its favorite codebook as feedback information to the base station. However, using only the common reference signal structure may imply disadvantages, e.g. that common reference signals cannot be alone optimal for different scenarios (e.g. high dispersion, line of sight (LoS) channel) and due to the fact that the feedback codebook information (in terms of number of bits) becomes relatively large since the designed codebook should satisfy all the scenarios and all the available antenna solutions.

In addition to common reference signals, dedicated reference signals can be employed to improve channel estimation, weighting verification, etc. For example, in the specification IEEE 802.16 the dedicated pilots are specified as an optional feature that can support the use of open loop pre-coding or closed-loop transmission in which the UE has no knowledge of the pre-coding/beam forming matrix such that not the used weights are signaled on the downlink control channel but rather a pre-coding pilot symbol. Consequently, the UE can use these dedicated pilot symbols to verify that weights are correctly applied to the system. It should be noted that dedicated pilots can be strictly user specific or the same set of dedicated pilots can be assigned to a group of users. The latter approach, obviously, requires less overhead. The specific design of dedicated pilots is not within the scope of this invention but there are different ways to design dedicated pilots, e.g. in US 2007/0025460 and US 2006/0109922. In general there are several benefits of having dedicated pilots. For instance different dedicated pilots can be designed and optimized for different scenarios (high dispersion, LoS channel, etc), channel estimation can be made better and improved estimation of cell orientation can be achieved. Another important advantage is reducing the feedback codebook signaling overheads (reduced number of bits) since scenario-specific codebook can be selected for the scenario under consideration instead of using a bulky code book encompassing all possible scenarios.

The concept of dedicated reference signals for MIMO operations is also applicable in TDD-based E-UTRAN systems.

Either SU-MIMO or MU-MIMO is used at a time within a cell. Switching between the two schemes is desirable to fully benefit from the gains of SU- and MU-MIMO in respective scenarios. The switching can be based on the amount of user traffic, radio conditions, quality of service requirement of users etc.

In the current E-UTRAN system, which is mainly based on the common reference signals, the switching can be either semi-static or fully dynamic. In either case the UEs in the cell are indicated via appropriate signalling. Since all users will use either of the two methods at a time, it is more resource efficient to broadcast the switching-related information to all users in the cell. It is also possible to perform blind switching between MIMO schemes, which implies the advantage that there are no signalling overheads and the switching is very fast; however, the UE is then not aware according to which scheme it is scheduled. Switching between SU-MIMO and MU-MIMO or vice versa is a well known technique used to exploit the benefit of both schemes. However, the assumption in FDD-based E-UTRAN is that the same common reference signals shall be used for both SU-MIMO and MU-MIMO, which is a simple design but not an optimal approach from the perspective of channel and cell orientation estimation. On the other hand, dedicated reference signals could be favoured for TDD-based E-UTRAN systems.

SU-MIMO and MU-MIMO schemes are generally best suitable in different scenarios, e.g. with regard to channel environment and traffic load. Therefore, the optimal pilots required for SU- and MU-MIMO might be different in different scenarios. This also implies that pilots should preferably be associated to the actually used scheme, i.e. specific to MU- and SU-MIMO schemes. In other words, dedicated or MIMO mode specific pilots are needed to achieve an optimum performance and fully exploit the benefits of a particular MIMO scheme.

For example, different schemes are suited in different environments. As shown in FIG. 1, per antenna rate control (PARC) with successive interference cancellation (SIC) is used as the antenna solution for SU-MIMO mode in a low-correlated scenario. On the other hand, a discrete Fourier transform (DFT-) based beam forming solution with orthogonal beam selection is used for MU-MIMO mode in a high correlated scenario. With the DFT-based beam forming solution the antenna weights are taken from discrete Fourier transform (DFT) based matrix and only orthogonal weights are selected to carry the signals of different users in the same resource block. The switching between SU- and MU-MIMO would then be advantageous to optimize the system for the case that the correlation changes in time, e.g. due to changes in the UE position. Similarly, indoor and outdoor environments using half wavelength transmit antennas exhibit different scattering situations where the use of a beam forming scheme is preferable for an outdoor environment but not for indoor environments. The DFT-based pilots can be used for outdoor high-correlated MU-MIMO scenarios whereas distributed FDM pilots can be used for indoor low-correlated SU-MIMO scenarios. It might be sufficient to have only one set of dedicated pilots for a given scheme in a given scenario but when the scenario changes, e.g. due to a change in the system load, a different MIMO mode requiring another set of dedicated pilots can be used. The same set of dedicated pilots can be used for a group of MIMO users.

A set of dedicated pilot as described above differs from the traditional UE-specific pilots in the sense that the latter involves more overhead. Thus, the main advantage of the former approach (i.e. dedicated set of pilots specific to MIMO mode and scenario) is that it ensures good system performance (e.g. in terms of better channel estimation, CQI estimation, cell orientation estimation, etc) compared to common pilots and that it involves lower pilot overhead compared to UE-specific pilots.

In the preceding discussions, it is argued that different dedicated pilot symbols are optimal for SU- and MU-MIMO in different scenarios. Under this assumption, there will be a sharp transition between SU- and MU-MIMO modes when switching between these two modes. This is illustrated by FIG. 2, where at a certain TTI the transmission according to the current MIMO mode seizes and the other MIMO mode starts immediately in the next TTI. The dedicated pilots for SU- and MU-MIMO are respectively associated with certain weighting matrices $W_1$ and $W_2$ characterized by certain phase and amplitude values.

There are two drawbacks with the solution as illustrated by the example of FIG. 2: First, outstanding HARQ retransmissions (if any) at the switching time can either be lost or can be delayed. This is because the same user may not be scheduled immediately when the next MIMO mode starts. Another drawback is that during the first TTI(s) when the new MIMO mode is applied, the UE will report CQI according to the previous MIMO mode. Thus, the channel or cell orientation estimation (forecast) may be based on the wrong dedicated pilots due to the mode switching and at least in the first TTI the decisions for scheduling, power control, and link adaptation will not be based on the appropriate pre-coding matrices leading to a data throughput loss.

SUMMARY

It is thus an object of the present invention to achieve a method and arrangement for improving data throughput in MIMO-based communication systems when applying switching between single-user and multi-user transmission modes.

This and other objects are achieved by a method performed in a base station for switching between different modes, single-user and multi-user mode, in a communications network, the network comprising a number of transmit and a number of receive antennas. The present invention introduces a preparation phase, which duration is a multiple of the transmission time interval (TTI), during which appropriate reference signals (or predetermined sequences) corresponding to both the modes and with respective weighting matrices for these modes are transmitted by the base station. The purpose is to retrieve and collect MIMO-related feedback information for the new transmission mode from user equipments such that the base station can gain scheduling information to be readily applicable after the preparation phase when the new transmission mode is applied. The base station informs about start and, directly or indirectly, the duration of said preparation phase on a channel that is accessible for all or at least groups of user equipments.

The present invention also relates to a method in a user equipment receiving said reference signals (or predetermined sequences) corresponding to both said modes with respective weighting matrices for said modes during the preparation phase and providing feedback with respect to the new mode while maintaining communication according to the previous mode.

Further, the present invention relates to arrangements for use in a base station and for use in a user equipment comprising means for performing the methods described above.

The present invention involves thus the following advantages:

It is a first advantage of the present invention to allow a smooth transition between MIMO modes, in particular between SU- and MU-MIMO modes, as user equipments can in advance prepare and estimate CQIs according to the new MIMO mode before the base station performs the mode switching.

It is a further advantage of the present invention to minimize the losses of HARQ transmissions and especially HARQ retransmissions.

According to yet another advantage the present invention facilitates for the network to select the best users with regard to an optimised data throughput for scheduling as soon as the transmission starts according to the new MIMO mode.

Other objects, advantages and novel features of the invention will become apparent from the following detailed description of the invention when considered in conjunction with the claims and accompanying drawings.

BRIEF DESCRIPTION OF THE DRAWINGS

The invention will be described in a non limiting manner with reference to a number of embodiments illustrated in the drawings, in which.

DETAILED DESCRIPTION

The following description will be focused on E-UTRAN systems. However, it should be appreciated by a skilled person that the invention is applicable to other technologies, where MIMO or similar schemes employing dedicated reference signals are used. E-UTRAN uses OFDMA technology in the downlink. But both MIMO techniques can be employed in any access technology such as OFDMA, CDMA, TDMA, etc. This also encompasses systems according to the specification IEEE 802.16 that also use dedicated reference signals.

Although the description assumes that MIMO in FDD-based E-UTRAN systems will make use of only common reference signals, it should be understood that the invention may also be employed in future FDD E-UTRAN enhancements.

The following description relates, as a first aspect of the present invention, to the preparation phase:

The transition from SU-MIMO to MU-MIMO and vice versa is characterized by a preparation phase ($D_P$) having a length consisting of a number N of TTIs. During the preparation phase, the reference signals (and other relevant known sequences) required for both SU-MIMO and MU-MIMO are transmitted with their respective dedicated pilots that are associated with their respective weighting matrices $W_1$ and $W_2$. The duration of the preparation phase can either be standardized (i.e. having a fixed duration) or indicated to UE in a broadcast message (semi-static) or sent on a shared control channel (dynamic).

The preparation phase can be used to complete ongoing HARQ processes and to receive and collect channel estimate information (or CQI) related to the next MIMO mode in order to improve scheduling decisions and link adaptations.

Figure 1:
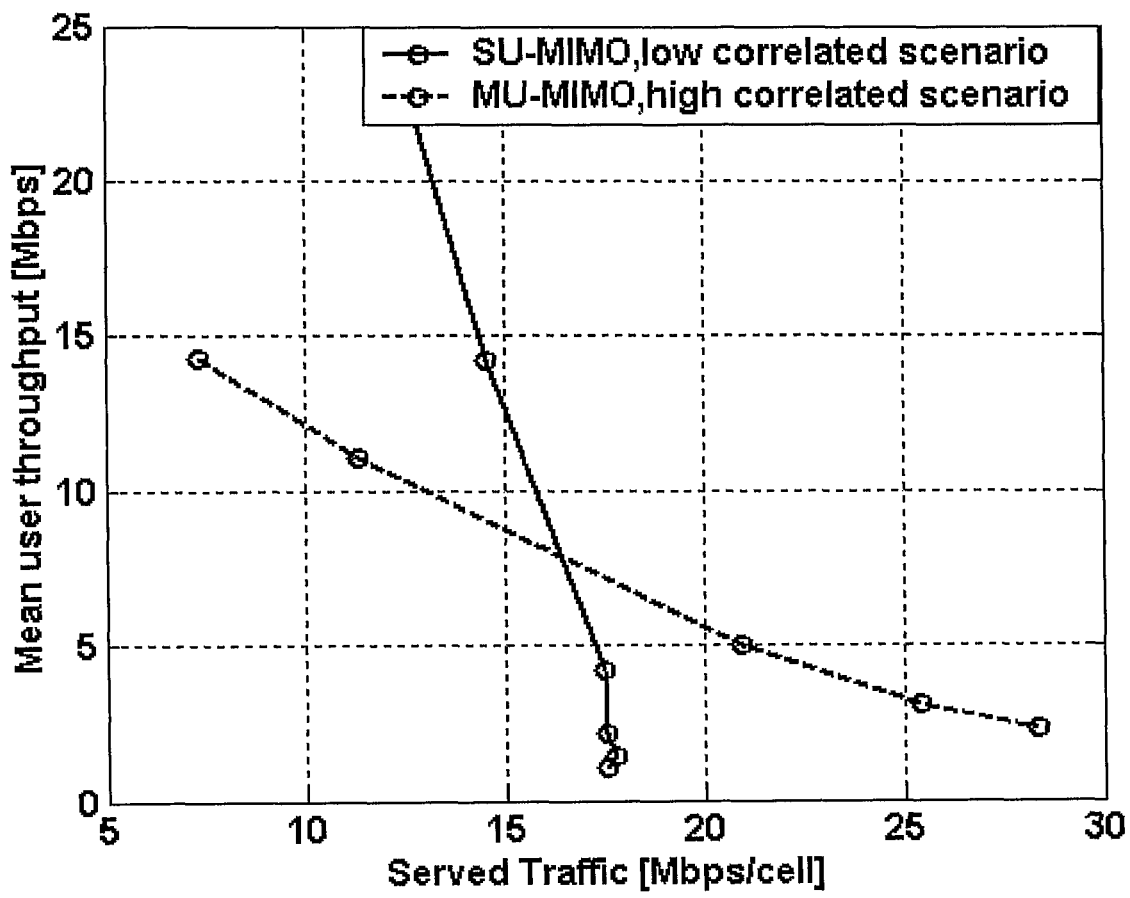
FIG. 1 shows the application of SU-MIMO and MU-MIMO in different channels and for different system load scenarios.
Figure 2:
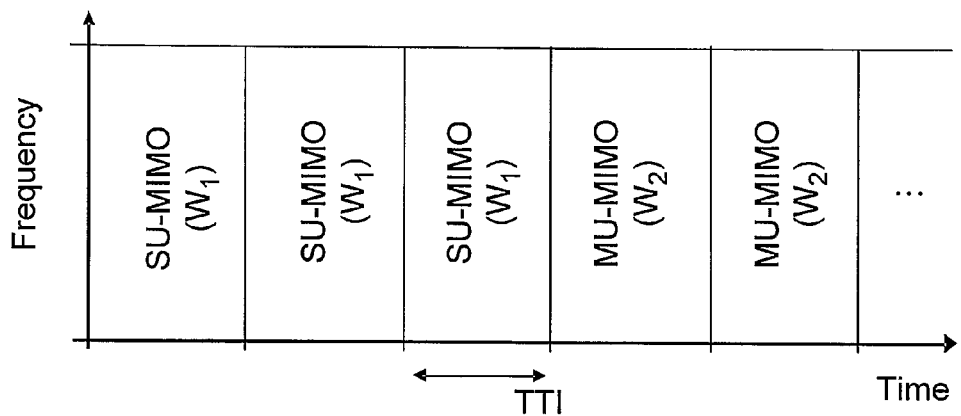
FIG. 2 illustrates switching scenario between SU-MIMO and MU-MIMO in E-UTRAN.
Figure 3:
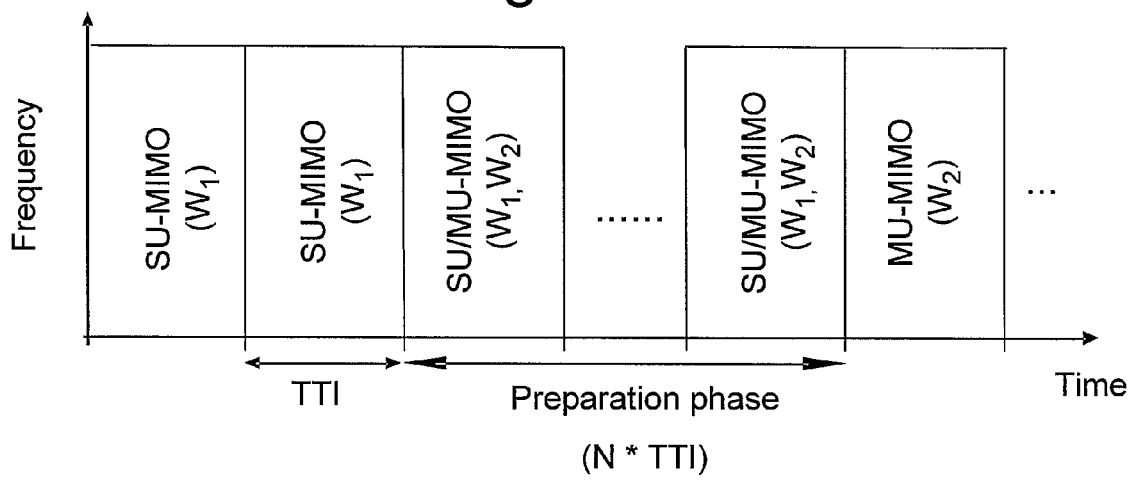
FIG. 3 illustrates the preparation phase when switching between SU-MIMO and MU-MIMO to ensure smooth transition.

Thus, by means of the present invention the switching between SU- and MU-MIMO modes does not take place instantaneously but instead there is a preparation phase with a duration ($D_P$) comprising of at least one or more TTI as shown in FIG. 3. As shown in the figure, during the preparation phase at least some reference signals (or relevant known sequences) are transmitted for both SU- and MU-MIMO modes with the corresponding weighting matrices $W_1$ and $W_2$, respectively. This is realizable since the position of reference signals are likely to be different (at least in frequency domain) for SU- and MU-MIMO. Furthermore, the weighting matrices $W_1$ and $W_2$ act only on the reference signals or known sequences.

During the preparation time, the already active users are scheduled according to the current (i.e. preceding) MIMO mode (SU-MIMO according to the example in FIG. 3). This allows the completion of ongoing HARQ processes and any outstanding HARQ retransmissions. On the other hand, during the preparation phase, the users are able to prepare for the next (i.e. proceeding) MIMO mode (MU-MIMO according to the example in FIG. 3). Preparation in the sense of the present invention means, inter alia, that the UEs are able to measure CQI according to the next MIMO mode and report this to the network. This will allow the network to select the correct users for scheduling when the new MIMO mode is activated. The preparation phase is at least one TTI.

Figure 4:
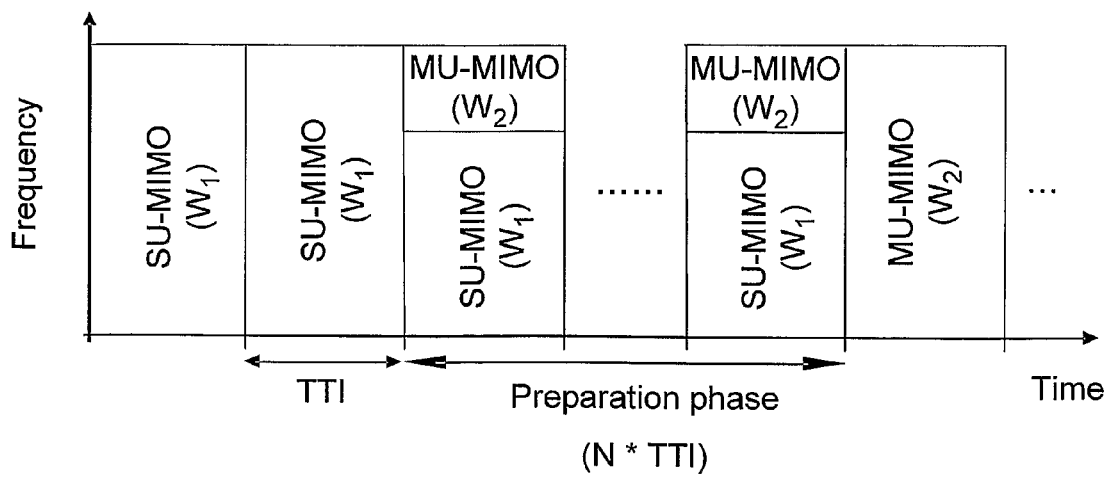
FIG. 4 illustrates preparation phase when limited to only part of the bandwidth.

Another possible arrangement of preparation phase is to send the reference signals using the weighting matrix of the new MIMO mode ($W_2$ in this example) in a part of the bandwidth (as shown in FIG. 4), which part though may not be used for data transmission.

One consequence of the introduction of a preparation phase is an additional overhead that is caused because reference signals for both MIMO modes are transmitted. However, the impact of this overhead is minimal since reference signals constitute a very small portion of the system bandwidth. On the contrary, if no preparation phase is used, there is risk of considerable throughput loss during first few TTIs after a MIMO-mode switch.

It is important that the CQI reporting delay is taken into account when setting the preparation phase as this makes sure that the appropriate CQI (i.e. according to the new MIMO mode) is available during the first TTI where the new MIMO mode starts. The CQI reporting delay is the combination of the measurement delay in the UE (standardized) and the processing delay at the base station (implementation dependent). Since the network is aware of all these delays the optimum duration of the preparation phase can easily be set. Typically the preparation delay will be in the order of 1 or few TTIs (2 or 3 TTI).

The following description relates, as a second aspect of the present invention, to various alternatives of mechanisms for providing information about the preparation phase as described above:

Rules related to preparation phase for switching between SU and MU MIMO need to be specified in the standard. There are three conceivable alternatives to specify, select, and signal the duration of the preparation phase to the UEs in a cell. These alternatives include fully static preparation phase (by means of pre-defined rules), fully dynamic preparation phase (signalling via Shared Control Channel), and semi-dynamic preparation phase (signalling via BCH and Shared Control Channel).

When applying a fully static approach the length of the preparation phase ($D_P$) is fixed to a multiple number N of TTIs. This length needs to be standardised in the radio network such that all network units can apply to it. According to further variants of this embodiment, the same value can be specified for all scenarios or different values for different scenarios. It is further possible to specify several values ($D_P$) for a given scenario.

It is sufficient to signal to the user equipments the TTI at which the preparation phase (or MIMO switching) shall start, denoted by $T_0$, just prior to switching (e.g. one TTI before the preparation phase starts) on an appropriate shared or common control channel that is accessible by all UEs. The signalled information need only to comprise of one bit if there is only one $D_P$ value specified for a given scenario. This is shown in the table 1 below:

| Shared control channel field | Interpretation |
| --- | --- |
| 0 | No preparation phase in next TTI |
| 1 | Preparation phase starts in next TTI |

In case that more than one $D_P$ value (e.g. K values) is specified, a multi-level signal is needed to indicate also the duration of the phases, which leads to an increase of the signalling overhead. The network has to send M bits ($K \leq 2^M$) as shown in the table 2 below:

| Shared control channel field | Interpretation |
| --- | --- |
| 0 | No preparation phase in next TTI |
| 1 | Preparation phase#1 starts in next TTI |
| 2 | Preparation phase #2 starts in next TTI |
| . | . |
| . | . |
| . | . |
| K | Preparation phase #K starts in next TTI |

Examples of shared control channel are physical downlink control channel (PDCCH) in E-UTRAN systems or HS-SCCH in UTRAN. In E-UTRAN the control information (PDCCH) be sent in first, second or third OFDMA symbol in some specified sub-carriers across the entire cell transmission bandwidth.

When applying a fully dynamic approach the length of the preparation phase ($D_P$) is not fixed but can instead be decided by each cell on a dynamic basis leading to a more flexible approach compared to the fully static case described above. For instance, in case the network notices that radio environment, traffic situation, and/or other conditions are congenial to switch to another MIMO mode and in case there are no HARQ transmission or retransmissions required, the network can select a very short preparation duration ($D_P$) such as one TTI. This is because the preparation phase is needed for users to measure CQI according to the next MIMO mode. On the other hand, in cases where HARQ transmissions and retransmissions are required, the network can choose larger preparation duration ($D_P$).

In this case the TTI at which the preparation phase (or MIMO switching) starts, denoted by $T_0$, as well as the preparation phase ($D_P$) itself have to be signalled to the UEs (just before the preparation phase starts) on some shared or common control channel that is accessible by all UEs. The obvious drawback is additional signalling overheads due to ($D_P$) are needed. More specifically multi-level signalling is unavoidable, i.e. 2 or more bits. The actual number of bits will depend upon the degree of flexibility desired. Hence, this method trades flexibility with the signalling overheads. Examples of shared control channels that can carry $T_0$ and $D_P$ are PDCCH in E-UTRAN system or HS-SCCH in UTRAN.

The semi-dynamic preparation phase is a compromise between the fully static and fully dynamic approach described above. According to the semi-dynamic approach the duration of the preparation phase ($D_P$) is sent on a broadcast channel (BCH). The new in idle mode (or low RRC activity state) when reselects a new cell, shall acquire the current $D_P$ value when decoding the BCH information. The network can change $D_P$ on slow time scale basis and modify the BCH information. In case of any change in $D_P$, the UE shall be required to read the change in BCH information and would thus acquire new $D_P$ value used in the cell. Another way is that the connected mode UEs shall be indicated the new $D_P$ value on dedicated connection via RRC signalling.

As in preceding cases, the TTI when the preparation phase (or MIMO switching) starts, denoted by $T_0$, needs to be signalled to the UEs on some shared common control channel, which is reachable to all UEs. In this case the signalled information (related to $T_0$) will comprise of only one bit according to the table 1 above. The information will indicate only the TTI when the preparation phase starts. The overhead on the shared control channel will therefore be minimal (same as in static case described earlier). The same shared control channels, as aforementioned are applicable to carry $T_0$ related information. Overall this scheme provides some flexibility but at the same time involves fewer overheads compared to a fully dynamic case.

Figure 5:
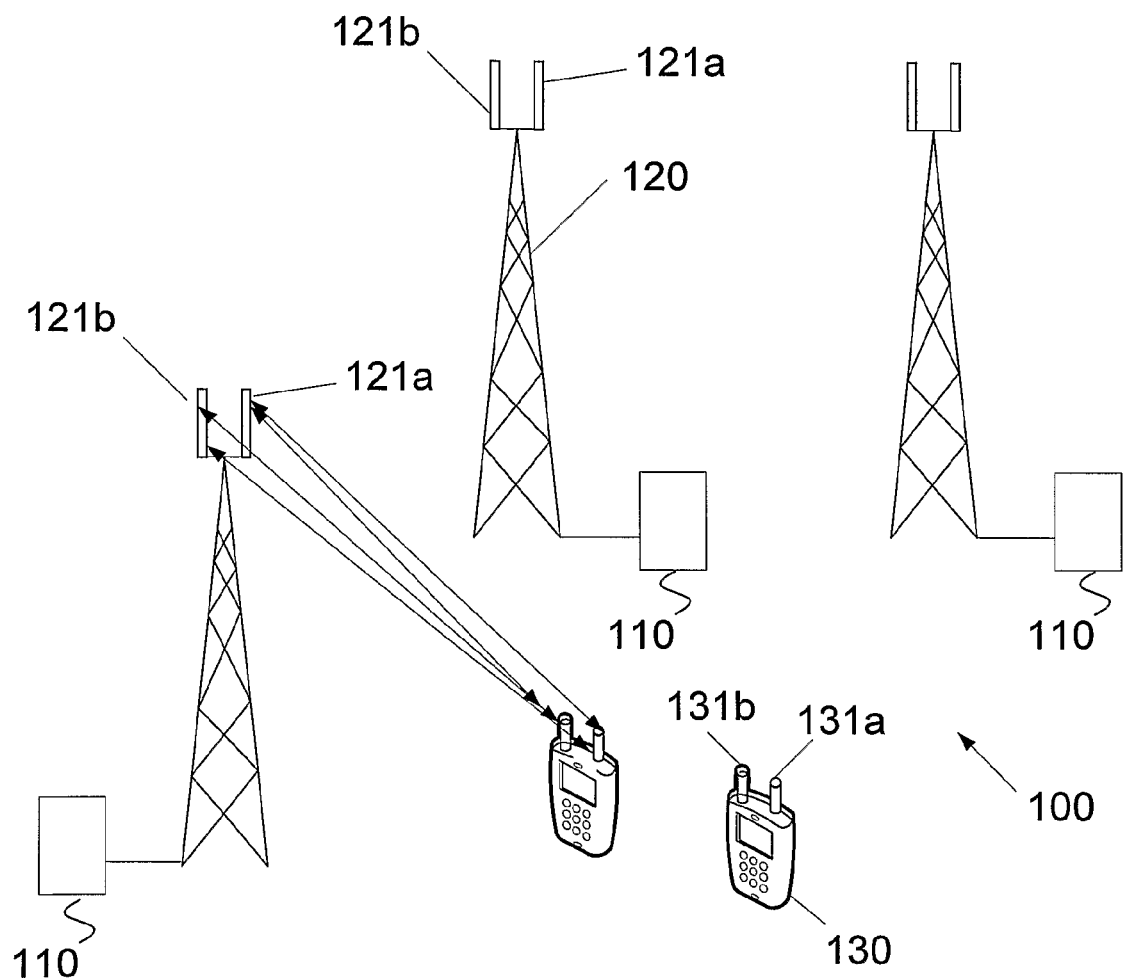
FIG. 5 illustrates a network according to the present invention.

FIG. 5 illustrates a MIMO communication network 100 comprising a number of base station 120 connected to antenna arrangements having one or two antennas 121a, 121b for transmitting and receiving data streams from user equipments 130, also provided with antennas 131a, 131b for transmitting and receiving data streams. In this case a MIMO system of 2×2 is illustrated. However, it should be appreciated by a skilled person that the number of antennas may vary.

The above mentioned steps can be described shortly for a radio base station, e.g. in a MIMO system as illustrated schematically in FIG. 5, using either all antennas to transmit data to the same user at a time using a unique reference signal sequence with a certain weighting matrix. Weighting matrices are characterized by certain phase and amplitude values.

The phase and amplitude transmitted to multiple or one user at the same time uses another reference signal sequence having a different weighting matrix. The switching between the single user transmission and multiple user transmission is semi-dynamically or dynamically. Switching from single-user to multi-user MIMO modes or vice versa includes the steps of:

Transmitting reference signals or known sequences, corresponding to both single-user and multi-user MIMO with their respective weighting matrices, during the preparation phase which comprises of one or more transmission time interval (TTI).

Indicating at least the start and (according to certain embodiments) the duration of the preparation phase all the user equipments in a cell.

During the preparation phase, reference signals for both single-user and multi-user MIMO modes may be spread across the entire cell transmission bandwidth while reference signals for the existing MIMO mode and the proceeding (next MIMO) mode may be limited to different portions of the cell transmission bandwidth. One or more patterns of the preparation duration are specified according to pre-defined rules. Moreover, one or more bit of information is sent via a shared control channel to all user equipments in a cell indicating the start of the preparation phase in the next TTI and, if necessary, also indicating the pointer to the actual preparation duration out of the specified preparation durations, shall be used. It is also possible to send multi-level signalling via a shared control channel to all user equipments in a cell indicating the start of the preparation phase in the next TTI and also the absolute value of the preparation duration.

The pattern of the preparation phase may be sent on the broadcast channel to all user equipments in a cell or on the shared data channel individually to the user equipments, in addition one bit of information is sent to all user equipments indicating the start of the preparation phase in the next TTI. During the preparation phase, the radio base station may intend to complete HARQ retransmissions and also initial transmissions if possible of the on going sessions according to the current MIMO mode. The radio base station can use the channel quality feedback information related to the new (or proceeding) MIMO mode from the user equipment during the preparation phase and use it for appropriate scheduling, power control, link adaptation and other radio resource allocation techniques when data transmission according to the new MIMO mode starts.

Figure 6:
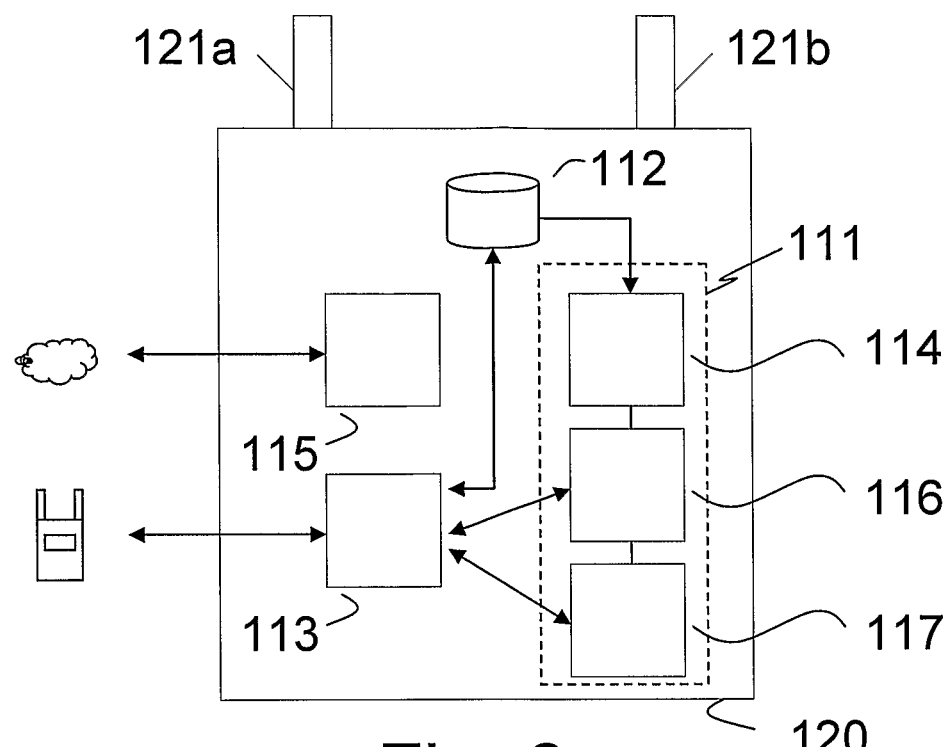
FIG. 6 illustrates schematically in a block diagram an infrastructure device according to the present invention.

FIG. 6 illustrates a base station 120 (or a communication gateway) according to the present invention. The base station comprises at least one processing arrangement 111 and at least one memory 112 (volatile and/or non-volatile), e.g. applicable for collecting and storing feedback information received from user equipments during the preparation phase. It comprises further a communication interface 113 towards the UE 130 and a communication interface 115 towards an infrastructure network. The base station further comprises means 116 for preparing for transmission reference signals or predetermined sequences corresponding to both said modes with respective weighting matrices for said modes during the preparation phase of a length of one or more transmission time intervals (TTI), and means 117 for preparing for transmitting on a common channel, signalling information indicating start and duration of said preparation phase to all receiving equipments in a reception area. The base station may include a scheduler 114 for scheduling user equipments after said preparation phase based on the feedback information received from user equipments. Many of the functions described above can be executed, e.g., by means of the processing arrangement 111.

Thus, during the preparation phase the user equipments can estimate the channel characteristics and channel quality of the new MIMO mode, and are able to report the corresponding channel quality to the radio base station if required.

Figure 7:
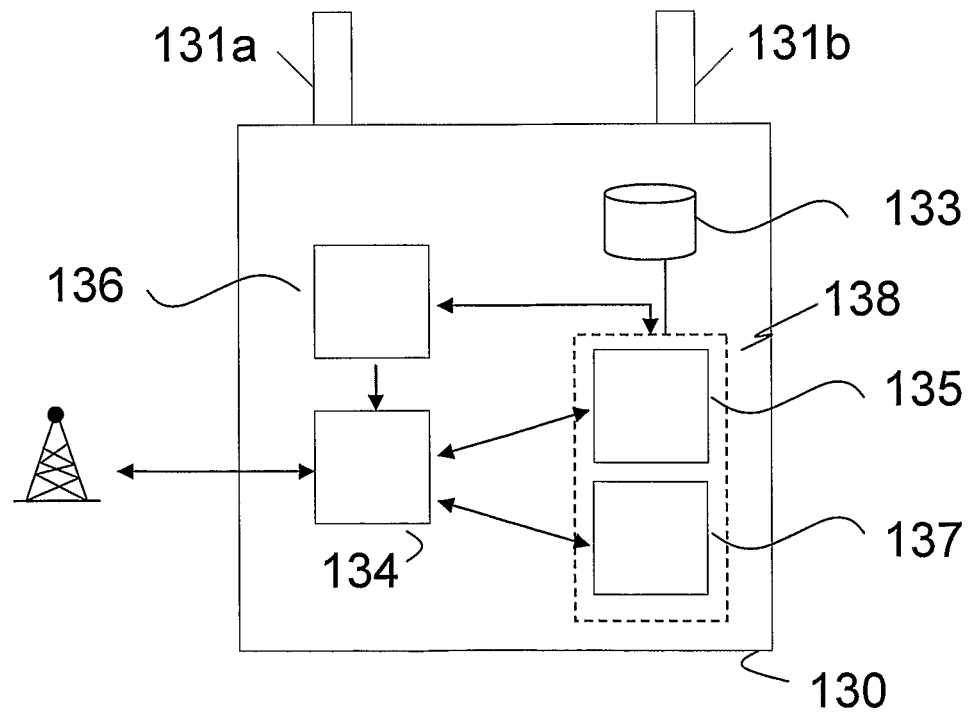
FIG. 7 illustrates schematically in a block diagram a user device according to the present invention.

The user equipment 130, illustrated schematically in FIG. 7, which receives transmission from one or more transmit antennas 131a,131b, when radio base station switches from single-user to multi-user MIMO modes or vice versa, comprises a receiving portion 137, receiving reference signals or known sequences corresponding to both single-user and multi-user MIMO with their respective weighting matrices, during the preparation phase which comprises of one or more transmission time interval (TTI), means for receiving and correctly interpreting signalling information from the radio base station transmitted on shared control channel, which indicates the start and duration of the preparation phase (which may be done by a computational unit 132), means 136 for providing feedback with respect to the new transmission mode while maintaining communication according to the previous mode.

The UE may further comprise a memory unit 133, a user interface unit 134, a power supply 135, and antennas 131a, 131b. The components of the UE are well known to the skilled person.

Figure 8:
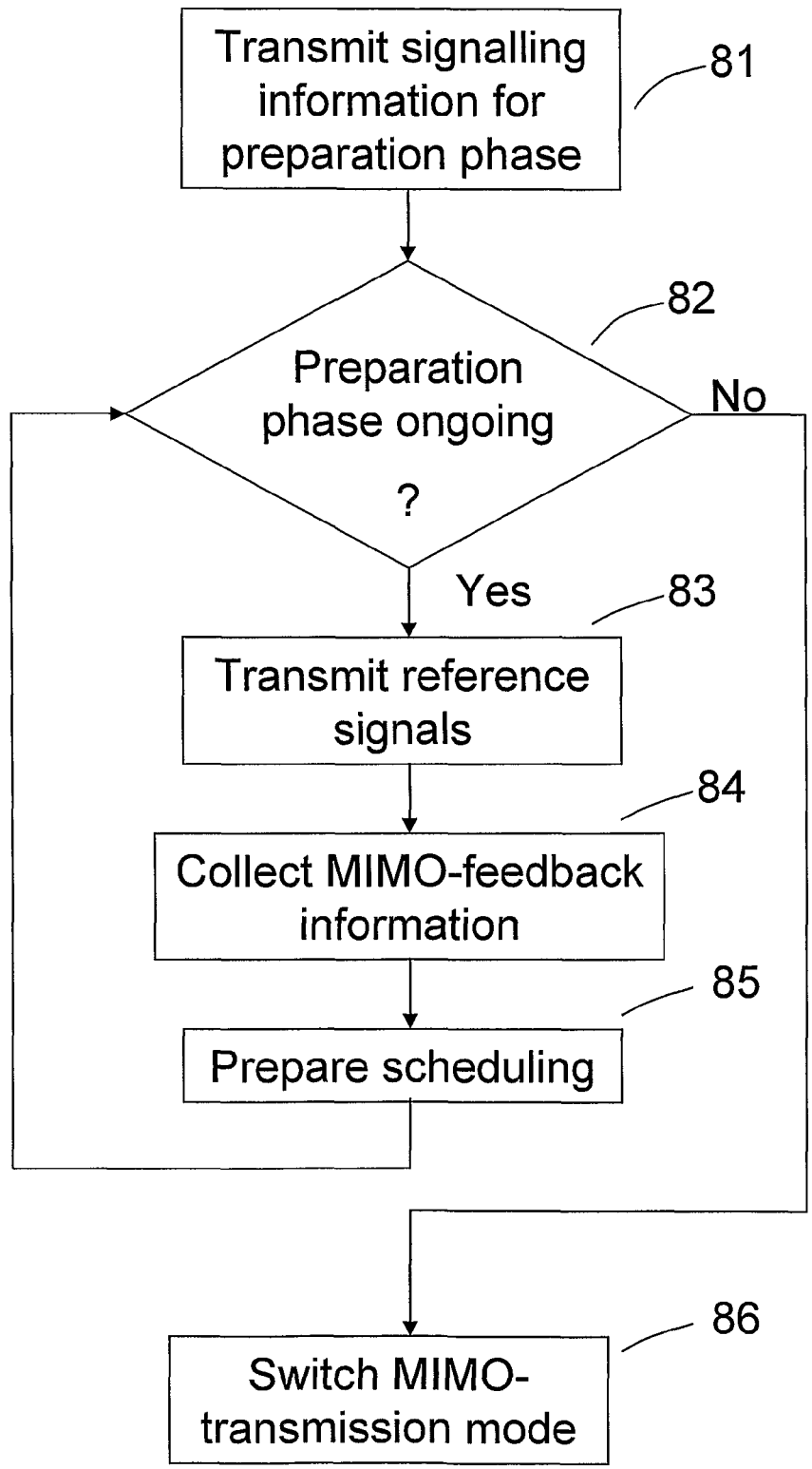
FIG. 8 illustrates a flowchart of the method according to the present invention as performed in a base station.

FIG. 8 illustrates a flowchart of the method according to the present invention as performed in a radio base station 120. Said method is intended for switching between different MIMO-transmission modes in a communications network 100, namely between single-user mode and a multi-user mode and vice versa. In said method, the radio base station 120 transmits 81 on a common or shared channel signalling information including at least an indication of the start of a preparation phase to all receiving user equipments 130 within a reception area and transmits 83, after the preparation phase has started, reference signals corresponding to both said MIMO-transmission modes with respective weighting matrices for the modes during the preparation phase 82. After said preparation phase, the MIMO-transmission mode is switched from the previously applied mode, i.e. before and during the preparation phase, to the new applied mode, i.e. after the preparation phase. Further, during the preparation phase the radio base station 120 collects 84 MIMO-feedback information from the user equipments 130 and uses this information for preparing 85 the scheduling of user equipments with the best feedback for those streams that will be used for downlink transmission after the preparation phase, when applying the new MIMO-transmission mode.

Figure 9:
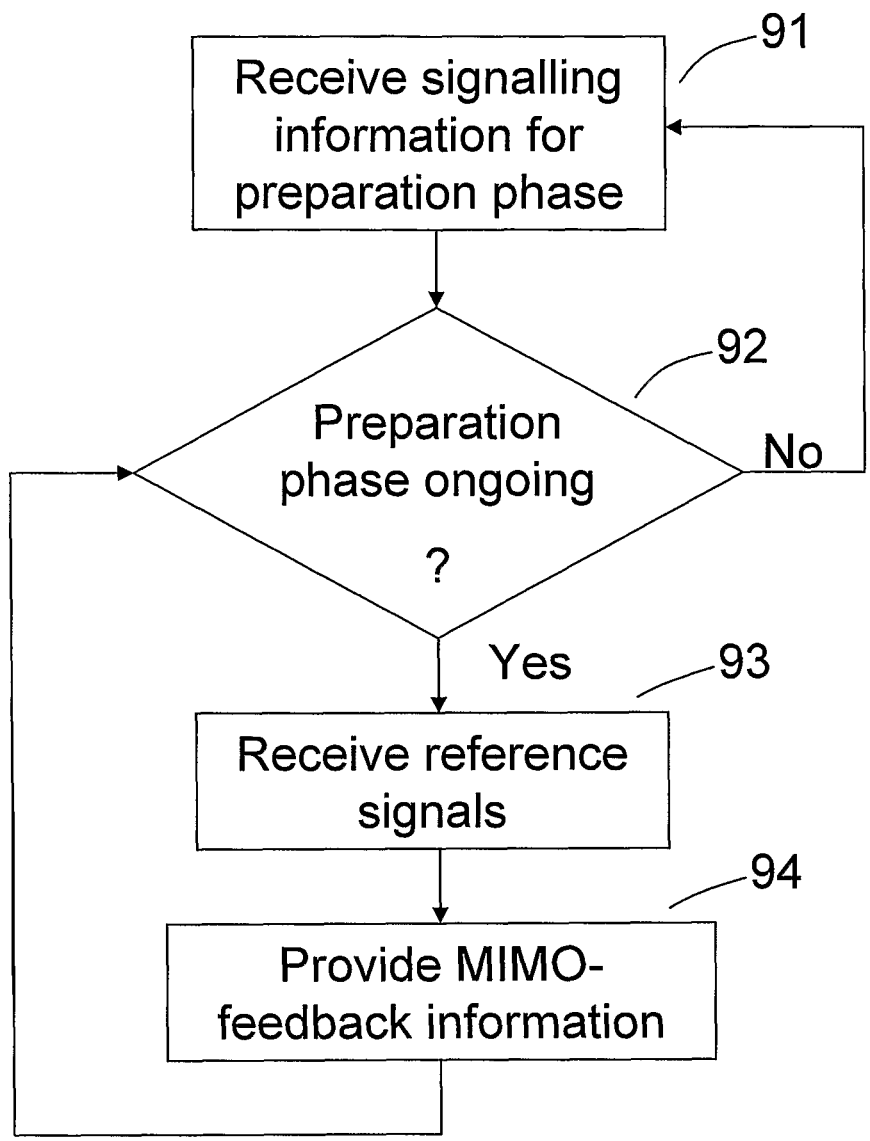
FIG. 9 illustrates a flowchart of the method according to the present invention as performed in a user equipment.

FIG. 9 illustrates a flowchart of the method according to the present invention as performed in a user equipment 130. 11. Said method is intended for supporting a switching between different MIMO-transmission modes in a communications network 100, namely between single-user mode and a multi-user mode and vice versa. In said method the user equipment 130 receives 91 and interprets signalling information transmitted on a common or shared channel including at least an indication of the start of a preparation phase. After said preparation phase has started the user equipment 130 receives 93 reference signals corresponding to both said modes with respective weighting matrices for the modes and provides 94 MIMO-feedback information on data streams used for downlink transmission during the preparation phase with respect to a new MIMO-transmission mode, i.e. to be applied after the preparation phase while maintaining communication according to the previously applied MIMO-transmission mode, i.e. before the preparation phase.

The MIMO technologies, given as examples, provide spatial multiplexing, spatial diversity and/or beam forming gains by using multiple transmit and multiple receive antennas. The SIMO and MISO are special cases of MIMO, therefore the invention is also applicable for SIMO and MISO deployments. In SIMO method multiple receive antennas coherently combine received signals from a single transmit antenna. In MISO, transmit diversity is achieved by employing multiple transmit antennas and single receive antenna.

ABBREVIATIONS

UE User Equipment
UTRAN: UMTS Terrestrial Radio Access Network
E-UTRAN: Evolved UTRAN
TTI: Transmission time interval
MIMO: Multiple Input Multiple Output
BCH: Broadcast channel
PDCCH: Physical downlink control channel
HS-SCCH: High speed signaling control channel
CQI: Channel quality indicator
SU-MIMO: Single user MIMO
MU-MIMO: Multi-user MIMO
PARC: Per antenna rate control
SIC: Successive interference cancellation
DFT: Discrete Fourier Transform
LoS: Line of sight

The invention claimed is:

1. A method in a base station for switching between different MIMO-transmission modes in a communications network, said network comprising a number of transmit antennas and a number of receive antennas, said modes comprising a single-user mode and a multi-user mode, comprising the steps of:

transmitting on a common or shared channel signalling information including at least an indication of the start of a preparation phase, wherein said preparation phase is related to switching between the single user-mode and the multi user-mode, wherein said signalling information is transmitted to all receiving user equipments in a reception area; and transmitting reference signals corresponding to both said MIMO-transmission modes with respective weighting matrices for the modes during said preparation phase for switching between the single user-mode and the multi user-mode comprising of one or more transmission time intervals (TTI).

2. The method according to claim 1, whereby the signalling information further includes an indication of the duration of said preparation phase.

3. The method according to claim 1, further comprising the steps of:

collecting MIMO-feedback information from user equipments during the preparation phase; and preparing scheduling the user equipments having the best feedback for those streams that will be used for downlink transmission to be applied after the preparation phase.

4. The method of claim 1, wherein said common or shared channel is a downlink shared control channel.

5. The method of claim 1, wherein said common or shared channel is a broadcast control channel.

6. The method of claim 1, wherein information related to the said preparation phase is partly transmitted using downlink shared control channel and partly by broadcast channel.

7. The method of claim 1, wherein all transmit antennas are used to transmit data to a same user equipment at a time using a first unique reference signal sequence with a certain weighting matrix with certain phase and amplitude.

8. The method of claim 7, further comprising using a second reference signal sequence having a different weighting matrix.

9. The method of claim 1, wherein a first reference signal sequence and a second reference signal sequence are transmitted using different sub-carriers during a preparation phase.

10. The method according to claim 1, wherein said switching between modes is done semi-dynamically or dynamically.

11. The method according to claim 1, wherein the signalling information further includes a duration of said preparation phase being a multiple of the TTI.

12. The method according to claim 1, wherein, based on said transmitting of said signalling information and reference signals, said receiving user equipment can further estimate channel quality indicator information according to said switched-to mode of operation prior to said switching occurring.

13. A method in a user equipment comprising a number of antennas for receiving signals in different MIMO-transmission modes in a communications network, said modes comprising a single-user mode and a multi-user mode, comprising the steps of:
  receiving and interpreting signalling information transmitted on a common or shared channel including at least an indication of the start of a preparation phase, wherein said preparation phase is related to switching between the single user-mode and the multi user-mode;
  receiving reference signals corresponding to both said modes with respective weighting matrices for the modes during the preparation phase for switching between the single user-mode and the multi user-mode comprising of one or more transmission time intervals (TTI); and
  providing MIMO-feedback information on data streams used for downlink transmission during the preparation phase for switching between the single user-mode and the multi user-mode with respect to a new MIMO-transmission mode while maintaining communication according to the previously applied MIMO-transmission mode.

14. The method of claim 13, wherein the said information is received on either shared control channel or on broadcast channel or on both thereof.

15. An arrangement for use in a base station in a communications network, said base station communicating with a number of antennas, said arrangement being provided for switching between different modes in said communications network, said modes comprising a single-user mode and a multi-user mode, further comprising:
  means for preparing transmission reference signals corresponding to both said modes comprising respective weighting matrices for said modes during a preparation phase, wherein said preparation phase is related to switching between the single user-mode and the multi user-mode, said preparation phase comprising of one or more transmission time intervals (TTI); and
  means for preparing for transmitting on a common or shared channel signalling information including at least an indication of the start of said preparation phase for switching between the single user-mode and the multi user-mode to receiving user equipments in a reception area.

16. The arrangement of claim 15, wherein the signalling information further includes an indication of the duration of said preparation phase.

17. The arrangement of claim 15, further comprising:
  means for collecting feedback information from all user equipments during the preparation phase; and
  a scheduler for scheduling user equipments having the best feedback for those streams that will be used for downlink transmission to be applied after the preparation phase.

18. The arrangement of claim 15, wherein the said information is transmitted on either a common or shared control channel or on broadcast channel or on both thereof.

19. An arrangement for use in a user equipment comprising a number of antennas, said arrangement being provided for receiving signals in different modes in a communications network, said modes comprising a single-user mode and a multi-user mode, further comprising:
  means for receiving reference signals corresponding to both said modes with respective weighting matrices for said modes during a preparation phase, wherein said preparation phase is related to switching between the single user-mode and the multi user-mode, said preparation phase comprising one or more transmission time intervals (TTI),
  means for receiving and correctly interpreting signalling information transmitted on a common or shared channel including at least an indication of the start of the preparation phase for switching between the single user-mode and the multi user-mode; and
  means for providing feedback with respect to the new mode while maintaining communication according to the previous mode.

20. The arrangement of claim 19, wherein the said information is received on either shared control channel or on broadcast channel or on both thereof.

21. The arrangement of claim 19 for use in at least one of Multiple Input Multiple Output (MIMO), Single Input Multiple Output (SIMO) or Multiple Input Single Output (MISO) system.

* * * * *